United States Patent [19]

Trippett

[11] 4,445,792
[45] May 1, 1984

[54] VARIABLE PRELOAD FOIL BEARING

[75] Inventor: Richard J. Trippett, Birmingham, Mich.

[73] Assignee: General Motors Corporation, Detroit, Mich.

[21] Appl. No.: 443,196

[22] Filed: Nov. 22, 1982

[51] Int. Cl.³ .................... F16C 32/06; F16C 23/02
[52] U.S. Cl. .................................. 384/103; 384/253
[58] Field of Search ................ 384/100–124, 384/247, 253, 261, 263

[56]  References Cited
U.S. PATENT DOCUMENTS 3,434,761  3/1969  Marley .
3,506,314  4/1970  Gross et al. .
3,520,578  7/1970  Licht ............................ 384/104

Primary Examiner—Stuart S. Levy
Assistant Examiner—Thomas R. Hannon
Attorney, Agent, or Firm—Patrick M. Griffin

[57] ABSTRACT

An axial shaft is supported within a housing by a plurality of bearing foils which are cantilevered from the housing by a series of rotatably mounted supports. The supports are provided with gear teeth and a ring gear which surrounds the housing is engageable with the gear teeth of the supports to simultaneously rotate these supports relative to the housing and adjust the preload of the bearing foils against the shaft.

2 Claims, 1 Drawing Figure

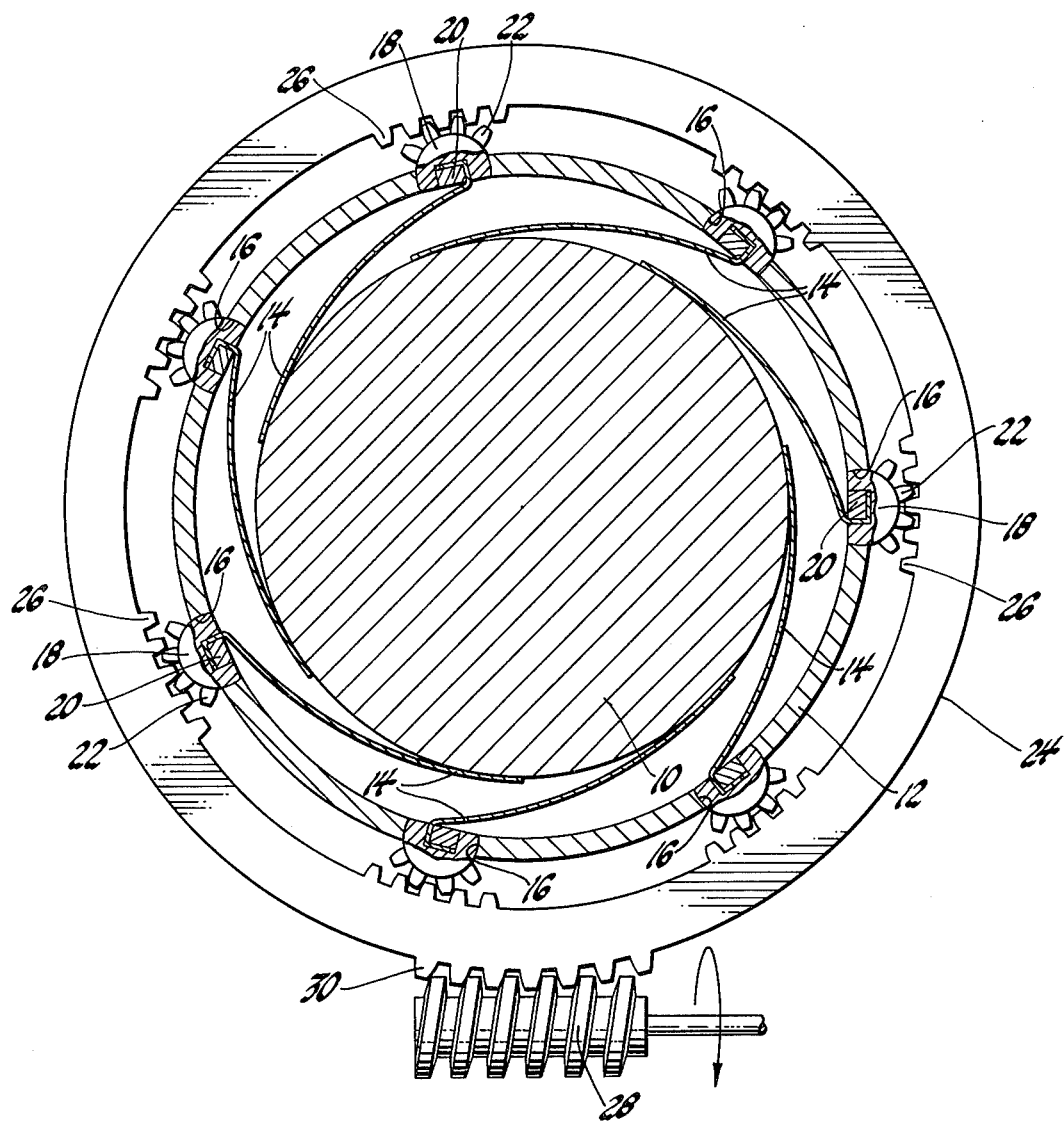

VARIABLE PRELOAD FOIL BEARING

This invention relates to hydrodynamic foil bearings and specifically to a hydrodynamic foil bearing in which the preload of the bearing foil against an axial shaft may be adjusted.

BACKGROUND OF THE INVENTION

Typically, in a hydrodynamic bearing, a shaft rotatably contained within a housing is surrounded by a series of foils cantilevered from the housing which wrap the shaft in a series of line contacts parallel to the axis of the shaft under a predetermined preload or tension. This wrapping creates about the surface of the shaft a series of wedge shaped pockets. Relative high speed rotation of the shaft relative to the pockets develops or induces a viscous shear which wipes or draws a fluid, such as ambient air, between the shaft surface and the foils to create a very low friction, supporting gas film. The preload affects significantly the stiffness of the bearing and its operating characteristics, such as start-up torque.

While such a bearing works well at high speeds, problems exist during startup and coast down, when the induced viscous shear support film is absent. At startup, the shaft rests and drags on the bottom of the housing, creating a large starting torque, and a large eccentricity between the starting and final position of the center axis of the rotating shaft. This eccentricity creates a problem in certain applications, such as turbo chargers, since such shaft misalignment decreases efficiency. Other unique problems are present in the turbo charger environment, including thermal expansion of the housing to which the foils are mounted, which affects the preload of the foils, and foil wear from the frequent starts and stops, which also affects the tension or preload.

The prior art discloses some foil bearings in which the foil tension is adjustable. Gross et al U.S. Pat. No. 3,506,314 shows a foil bearing in a turbine application wherein a shaft is cradled within a housing by several foils in the form of slings, hung at one end to the inside of the housing, with the other end hung from a manually operable adjustable nut. This allows the slings to be shortened or tightened against the shaft. Marley U.S. Pat. No. 3,434,761 shows, in one embodiment, a foil bearing in a turbo expander application wherein cantilevered wrapping foils are spring loaded against the shaft surface. Adjusting screws threaded into the housing and engageable with the springs are manually adjusted to increase or decrease the tension of the foils against the shaft. The disadvantages of the systems are that a quick and simple simultaneous tension adjustment of the foils is not possible, each foil must be separately and manually adjusted. Nor may the foils be simultaneously and automatically adjusted in response to various bearing parameters, such as shaft angular rotation speed or temperature effects.

SUMMARY OF THE INVENTION

The subject invention solves the above outlined problems and deficiencies by providing a foil bearing in which the foils may be quickly, simply and simultaneously tension adjusted, either on a one-time basis or on a continuous, automatic basis responsive to bearing parameters.

In the embodiment disclosed, an axial shaft is rotatably supported inside a housing by cantilevered bearing foils in a generally conventional configuration. Each foil wraps the shaft under tension in a circumferential series of line contacts. However, rather than being conventionally rigidly attached to the housing, the foils are anchored to separate foil mounts which are rotatably mounted in axially extending slots in the housing. The foil mounts each have toothed driven portions circumferentially disposed about the shaft and engageable with the teeth of a driving ring gear which is rotatably supported relative to the housing.

As the ring gear is turned and held at a new relative position by any convenient drive means, such as a worm gear, the foil mounts are rotated to a new angular position relative to the housing, either decreasing or increasing the foil tension against the shaft surface. Thus, the preload of the foils and the bearing stiffness may be increased at startup, lifting the shaft away from the housing, and decreasing the eccentricity. Then, in response to increasing shaft angular speed, the foil tension may be decreased by turning the ring gear back, reducing friction as the hydrodynamic support film begins to form. In addition, foil tension may be adjusted in response to other bearing parameters, such as thermal expansion or sag, or to compensate for foil wear.

It is therefore an object of the invention to provide a foil bearing in which foil tension and bearing stiffness may be adjusted both initially and during bearing operation.

It is a further object to provide such a bearing in which the tension of the bearing foils may be quickly, simply and simultaneously adjusted in response to the shaft speed.

It is another object of the invention to provide such a bearing in which the shaft eccentricity may be controlled.

It is still a further object of the invention to provide such a bearing in which the bearing stiffness may be adjusted in response to other parameters, such as thermal expansion and wear of the bearing foils.

BRIEF DESCRIPTION OF THE DRAWINGS

These and other objects of the invention will appear from the following description and the drawing which shows a cross-section of the bearing, the foil mounts and the driving ring gear.

DESCRIPTION OF THE PREFERRED EMBODIMENT

Referring to the drawing, an axial shaft 10 is received within a housing 12 of generally cylindrical shape and is surrounded by a series of seven bearing foils 14. The foils 14 surround or wrap shaft 10 in a generally conventional pattern, engaging the surface of shaft 10 in a circumferential series of parallel, axial line contacts. Foils 14 are cantilevered to the inside of housing 12, by means to be described below.

The operation of shaft 10 with bearing foils 14 in a given adjusted position is conventional, with ambient air or other fluid being drawn in by the mechanism of viscous shear into the pockets to create a supporting gas film between foils 14 and shaft 10. It may be noted at this point that cylindrical housing 12 is cylindrical for convenience only, and some other housing or support would be feasible, provided the foils were supported in the same pattern. The crucial element is the wedge shaped pockets as described.

Housing 12 contains seven circumferentially evenly spaced, axially extending slots 16 of a generally semicircular cross section, having lengths generally equal to the length of the foils 14. Received within slots 16 are seven foil mounts consisting of rotatable rods 18. Foils 14 are conventionally anchored into rods 18 by pins 20. In a conventional bearing, foils 14 would be anchored by the same pins 20 but directly to the inside surface of cylindrical housing 12. On the outside of each rod 18, and accessible from the outside of cylindrical housing 12, is an arcuately arranged series of gear teeth 22 all of which are concentrically arranged relative to the center axis of the shaft 10, and which together constitute the driven portions of the rods 18. A ring gear 24 constitutes the drive mechanism and includes a series of gear teeth 26 which mesh with the gear teeth 22 of rods 18. Ring gear 24 is rotatably supported relative to housing 12 by any suitable means, not shown. Finally, a conventional worm gear 28 which could be driven by any suitable means, engages outside gear teeth 30 on ring gear 24 and releasably turns and holds ring gear 24 in any desired position relative to housing 12.

In operation, ring gear 24 is rotated either clockwise or counterclockwise by worm gear 28. The engagement of teeth 26 with teeth 22 in turn rotates rods 18 within slots 16 and increases or decreases the bias of foils 14 against the outside of shaft 10. Thus, at bearing startup, ring gear 24 may be turned counterclockwise to increase the tension or bias of foils 14 against shaft 10. This lifts shaft 10 away from the bottom of housing 12 to the extent desired and supports it until such time as the angular rotational speed of shaft 10 is enough to create a hydrodynamic fluid support film described above. At such time, ring gear 24 may be turned clockwise to decrease the rubbing force of foils 14 on shaft 10. It would be a relatively simple matter to calibrate worm gear 28 and ring gear 24 to correlate various angular positions of ring gear 24 relative to housing 12 with the resultant tension or bias of foils 14 on shaft 10. Worm gear 28 could then be programmed through suitable electronic controls to turn to a desired position to create a desired tension or bias at any desired rotational speed of shaft 10. Thus, it may be seen that foils 14 may be adjusted relative to shaft 10 simultaneously, quickly, and also automatically. In addition, the tension or bias of the lower foils 14 against shaft 10 could be set higher initially, prior to setting the ring gear 24 in place. The relative change in tension would still be equal for all foils 14 for the same total angular rotation of ring gear 24. In addition, in an environment of high temperatures, cylindrical housing 12 might expand and decrease the tension or bias of bearing foils 14. Suitable electronic controls could also turn ring gear 24 to compensate therefor. In addition, wear of the foils 14, which would decrease the tension 14, could be compensated for in like manner.

It should be understood that various modifications could be made in the embodiment as disclosed without changing the operation thereof. It has already been mentioned that the shape of housing 12 could be different. In addition, rods 18 could be mounted in some other rotatable fashion, the axial slots 16 are not strictly necessary. Gear teeth 22 could be located anywhere on rods 18, for example, at the end of cylindrical housing 12, and could, conceivably, even be on the other side of rods 18 and engageable by a gear with teeth on the outside rather than on the inside thereof. Any means which would turn and hold the rods 18 simultaneously could also be substituted for ring gear 24.

The embodiments of the invention in which an exclusive property or privilege is claimed are as follows:

1. In a hydrodynamic foil bearing of the type having an axial shaft rotatably supported with respect to a housing by a plurality of cantilevered foils bearing against the shaft surface, means for adjustably mounting the foils with respect to the housing to vary the preload of the foils against the shaft surface, comprising,
   a plurality of axially extending foil mounts rotatably supported relative to the housing and concentrically arranged about the shaft, each mount having a foil attached thereto to cantilever the foils to the housing, each mount having a driven portion,
   a drive mechanism rotatably supported relative to the housing and engageable with the driven portions of the foil mounts to simultaneously rotate the mounts relative to the housing and vary the preload of the foils against the shaft surface,
   and means for releasably holding the drive mechanism in any rotative position thereof relative to the housing.

2. In a hydrodynamic foil bearing of the type having an axial shaft rotatably supported inside a housing by surrounding cantilevered foils bearing against the shaft surface, means for adjustably mounting the foils with respect to the housing to vary the preload of the foils against the shaft surface, comprising,
   a plurality of axially extending foil mounts rotatably supported relative to the housing, each mount having a foil attached thereto to cantilever the foils to the housing, each mount having a series of gear teeth accessible from outside the housing and concentrically arranged about the axis of the shaft,
   driving gear means rotatably supported relative to the housing and having gear teeth engageable with the gear teeth of the rotatable mounts to simultanously rotate the mounts relative to the housing and vary the preload of the foils against the shaft surface,
   and means for releasably holding the driving gear means in any rotative position thereof relative to the housing.

* * * * *